US012689250B2

(12) United States Patent
Han et al.

(10) Patent No.: US 12,689,250 B2
(45) Date of Patent: Jul. 21, 2026

(54) STATOR SEAT, STATOR ASSEMBLY, MOTOR, LIDAR, AND CARRIER SYSTEM

(71) Applicant: INNOVUSION (NINGBO) CO., LTD., Ningbo (CN)

(72) Inventors: Jie Han, Ningbo (CN); Siwei Luo, Ningbo (CN); Jian Zhao, Ningbo (CN)

(73) Assignee: TUDATONG (SUZHOU) CO., LTD., Suzhou (CN)

( * ) Notice: Subject to any disclaimer, the term of this patent is extended or adjusted under 35 U.S.C. 154(b) by 100 days.

(21) Appl. No.: 18/539,159

(22) Filed: Dec. 13, 2023

(65) Prior Publication Data

US 2024/0213830 A1      Jun. 27, 2024

(30) Foreign Application Priority Data

Dec. 23, 2022    (CN) .......................... 202223506868.8

(51) Int. Cl.
| | |
|---|---|
| *H02K 1/18* | (2006.01) |
| *G01S 7/481* | (2006.01) |
| *H02K 1/14* | (2006.01) |
| *H02K 21/22* | (2006.01) |
| *G02B 26/08* | (2006.01) |

(52) U.S. Cl.
CPC .............. *H02K 1/18* (2013.01); *G01S 7/4817* (2013.01); *H02K 1/146* (2013.01); *G02B 26/085* (2013.01)

(58) Field of Classification Search
CPC .......... H02K 1/18; H02K 21/146; H02K 5/04; H02K 21/22; H02K 3/50
USPC .................................... 310/67 R, 90, 216.113
See application file for complete search history.

(56) References Cited

U.S. PATENT DOCUMENTS

| | | | |
|---|---|---|---|
| 3,897,150 | A | 7/1975 | Bridges et al. |
| 4,464,048 | A | 8/1984 | Farlow |
| 5,006,721 | A | 4/1991 | Cameron et al. |
| 5,157,451 | A | 10/1992 | Taboada et al. |
| 5,319,434 | A | 6/1994 | Croteau et al. |
| 5,369,661 | A | 11/1994 | Yamaguchi et al. |
| 5,442,358 | A | 8/1995 | Keeler et al. |

(Continued)

FOREIGN PATENT DOCUMENTS

| | | | |
|---|---|---|---|
| CN | 1677050 A | | 10/2005 |
| CN | 102545414 A | * | 7/2012 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Jose A Gonzalez Quinones
(74) *Attorney, Agent, or Firm* — MASCHOFF BRENNAN; Ran Pang; Liang Huang

(57) ABSTRACT

The present disclosure provides a stator seat, a stator assembly, a motor, a LiDAR, and a carrier system. The stator seat comprises a mounting column, the mounting column has a first end and a second end opposite to each other, an outer side wall of the mounting column proximate to the second end is provided with a surrounding mounting boss, the mounting boss is provided with an avoidance structure, and the avoidance structure is configured to avoid a winding of a wound stator.

17 Claims, 10 Drawing Sheets

(56) References Cited

U.S. PATENT DOCUMENTS

| | | | |
|---|---|---|---|
| 5,546,188 A | 8/1996 | Wangler et al. |
| 5,579,153 A | 11/1996 | Laming et al. |
| 5,657,077 A | 8/1997 | DeAngelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,576,837 B2 | 8/2009 | Lu et al. |
| 7,830,527 B2 | 11/2010 | Chen |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,658 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu et al. |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,576,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk et al. |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | van Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,968,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,609,112 B2 | 3/2020 | Chen |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,175,405 B2 | 11/2021 | Pacala et al. |
| 11,178,381 B2 | 11/2021 | Pacala et al. |
| 11,190,750 B2 | 11/2021 | Pacala et al. |
| 11,194,048 B1 | 12/2021 | Burbank et al. |
| 11,287,515 B2 | 3/2022 | Pacala et al. |
| 11,422,236 B2 | 8/2022 | Pacala et al. |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0082242 A1 | 4/2006 | Schill |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2008/0174762 A1 | 7/2008 | Lu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu et al. |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bösch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |

(56)            References Cited

U.S. PATENT DOCUMENTS

| | | |
|---|---|---|
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | McCloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Watnik |
| 2016/0291134 A1 | 10/2016 | Droz et al. |
| 2016/0301277 A1 | 10/2016 | Nowak et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0168261 A1* | 6/2017 | Itami ...................... G01S 7/4817 |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0226866 A1* | 8/2018 | Kanazawa ........... H02K 15/095 |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0028666 A1 | 1/2021 | Feng et al. |
| 2021/0088630 A9 | 3/2021 | Zhang |
| 2021/0311173 A1 | 10/2021 | Wang et al. |
| 2022/0247257 A1 | 8/2022 | Jefferies et al. |

FOREIGN PATENT DOCUMENTS

| | | | | |
|---|---|---|---|---|
| CN | 204758260 U | | 11/2015 | |
| CN | 204858804 U | * | 12/2015 | ............... H02K 5/00 |
| CN | 204885804 U | | 12/2015 | |
| CN | 108132472 A | | 6/2018 | |
| CN | 207457508 U | | 6/2018 | |
| CN | 207557465 U | | 6/2018 | |
| CN | 208314210 U | | 1/2019 | |
| CN | 208421228 U | | 1/2019 | |
| CN | 208705506 U | | 4/2019 | |
| CN | 106597471 B | | 5/2019 | |
| CN | 209280923 U | | 8/2019 | |
| CN | 209545264 U | * | 10/2019 | |
| CN | 108445468 B | | 11/2019 | |
| CN | 110031823 B | | 3/2020 | |
| CN | 108089201 B | | 4/2020 | |
| CN | 108594206 B | | 4/2020 | |
| CN | 109116331 B | | 4/2020 | |
| CN | 109917408 B | | 4/2020 | |
| CN | 109116366 B | | 5/2020 | |
| CN | 109116367 B | | 5/2020 | |
| CN | 110031822 B | | 5/2020 | |
| CN | 211655309 U | | 10/2020 | |
| CN | 109188397 B | | 11/2020 | |
| CN | 109814086 B | | 11/2020 | |
| CN | 109917348 B | | 11/2020 | |
| CN | 110492856 B | | 11/2020 | |
| CN | 110736975 B | | 11/2020 | |
| CN | 109725320 B | | 12/2020 | |
| CN | 110780284 B | | 12/2020 | |
| CN | 110780283 B | | 1/2021 | |
| CN | 110784220 B | | 2/2021 | |
| CN | 212623082 U | | 2/2021 | |
| CN | 110492349 B | | 3/2021 | |
| CN | 109950784 B | | 5/2021 | |
| CN | 213182011 U | | 5/2021 | |
| CN | 213750313 U | | 7/2021 | |
| CN | 214151038 U | | 9/2021 | |
| CN | 109814082 B | | 10/2021 | |
| CN | 113491043 A | | 10/2021 | |
| CN | 214795200 U | | 11/2021 | |
| CN | 214795206 U | | 11/2021 | |
| CN | 214895784 U | | 11/2021 | |
| CN | 214895810 U | | 11/2021 | |
| CN | 215641806 U | | 1/2022 | |
| CN | 112639527 B | | 2/2022 | |
| CN | 215932142 U | | 3/2022 | |
| CN | 112578396 B | | 4/2022 | |
| CN | 115267727 A | | 11/2022 | |
| CN | 223296134 U | | 9/2025 | |
| EP | 0 757 257 A2 | | 2/1997 | |
| EP | 1 237 305 A2 | | 9/2002 | |
| EP | 1 923 721 A1 | | 5/2008 | |
| EP | 2 157 445 A2 | | 2/2010 | |
| EP | 2 395 368 A1 | | 12/2011 | |
| EP | 2 889 642 A1 | | 7/2015 | |
| GB | 1 427 164 A | | 3/1976 | |
| GB | 2 000 411 A | | 1/1979 | |
| JP | 2007144667 A | | 6/2007 | |
| JP | 2010035385 A | | 2/2010 | |
| JP | 2017003347 A | | 1/2017 | |
| JP | 2017138301 A | | 8/2017 | |
| KR | 10-2012-0013515 A | | 2/2012 | |
| KR | 10-2013-0068224 A | | 6/2013 | |
| KR | 10-2018-0107673 A | | 10/2018 | |
| WO | 2017/110417 A1 | | 6/2017 | |
| WO | 2018/125725 A1 | | 7/2018 | |
| WO | 2018/129408 A1 | | 7/2018 | |
| WO | 2018/129409 A1 | | 7/2018 | |
| WO | 2018/129410 A1 | | 7/2018 | |
| WO | 2018/175990 A1 | | 9/2018 | |
| WO | 2018/182812 A2 | | 10/2018 | |
| WO | 2019/079642 A1 | | 4/2019 | |
| WO | 2019/165095 A1 | | 8/2019 | |

(56) References Cited

FOREIGN PATENT DOCUMENTS

| WO | 2019/165289 A1 | 8/2019 |
| WO | 2019/165294 A1 | 8/2019 |
| WO | 2020/013890 A2 | 1/2020 |

OTHER PUBLICATIONS

European Search Report, dated Jul. 17, 2020, for EP Application No. 18776977.3, 12 pages.
European Search Report, dated Jun. 17, 2021, for EP Application No. 18868896.4, 7 pages.
Extended European Search Report, dated Jul. 10, 2020, for EP Application No. 18736738.8, 9 pages.
Extended European Search Report, dated Jul. 22, 2020, for EP Application No. 18736685.1, 10 pages.
Fiber laser, Wikipedia, https://en.wikipedia.org/wiki/Fiber_laser, 6 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
International Preliminary Report on Patentability, dated Apr. 30, 2020, for International Application No. PCT/US2018/056577, 8 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.
International Search Report and Written Opinion, dated Jan. 3, 2019, for International Application No. PCT/US2018/056577, 15 pages.
International Search Report and Written Opinion, dated July 9. 2019, for International Application No. PCT/US2019/018987, 17 pages.
International Search Report and Written Opinion, dated Jun. 7, 2018, for International Application No. PCT/US2018/024185, 9 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
International Search Report and Written Opinion, dated Mar. 23, 2018, for International Application No. PCT/US2018/012704, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Sep. 18, 2018, for International Application No. PCT/US2018/012116, 12 pages.
Mirrors, Physics LibreTexts, https://phys.libretexts.org/Bookshelves/Optics/Supplemental_Modules_(Components)/Mirrors, (2021), 2 pages.
Office Action Issued in Japanese Patent Application No. 2019-536019 dated Nov. 30, 2021, 6 pages.
"Why Wavelengths Matter in Fiber Optics", FirstLight, https://www.firstlight.net/why-wavelengths-matter-in-fiber-optics/ (2021), 5 pages,.
European Search Report and Search Opinion received for EP Application No. 23211209.4, mailed on May 21, 2024, 7 pages.

* cited by examiner

200

STATOR SEAT, STATOR ASSEMBLY, MOTOR, LIDAR, AND CARRIER SYSTEM

TECHNICAL FIELD

The present disclosure relates to the field of LiDARs, and more particularly, to a stator seat, a stator assembly, a motor for a rotating mirror of a LiDAR, a LiDAR, and a carrier system.

BACKGROUND ART

In autonomous driving and intelligent transportation technology, LiDAR is becoming an indispensable and important technical component. Taking autonomous driving as an example, the autonomous driving depends on good on-site perception and detection functions for virtual-real interaction.

A motor of the LiDAR comprises a stator assembly. The stator assembly comprises a stator seat and a wound stator. The wound stator is sleeved on the stator seat, and a winding is provided on the wound stator. The winding is likely to be squeezed against the stator seat, causing wire damage and the like, thereby affecting the safety of the motor.

SUMMARY

According to a first aspect of embodiments of the present disclosure, provided is a stator seat, comprising: a mounting column having a first end and a second end opposite to each other, wherein an outer side wall of the mounting column close to the second end is provided with a surrounding mounting boss, the mounting boss is provided with an avoidance structure, and the avoidance structure is configured to avoid a winding of a wound stator.

According to a second aspect of the embodiments of the present disclosure, provided is a stator assembly, comprising: the stator seat described above; and a wound stator sleeved on a mounting column of the stator seat.

According to a third aspect of the embodiments of the present disclosure, provided is a motor for a rotating mirror of a LiDAR, the motor comprising the stator assembly described above.

According to a fourth aspect of the embodiments of the present disclosure, provided is a LiDAR, comprising the rotating mirror described above.

According to a fifth aspect of the embodiments of the present disclosure, provided is a carrier system, comprising the LiDAR described above.

According to one or more embodiments of the present disclosure, the squeezing of the winding against the stator seat is reduced, thereby avoiding affecting the safety of the motor.

BRIEF DESCRIPTION OF THE DRAWINGS

The accompanying drawings Illustratively show embodiments and form a part of the specification, and are used to illustrate exemplary implementations of the embodiments together with a written description of the specification. The embodiments shown are merely for illustrative purposes and do not limit the scope of the claims. Throughout the accompanying drawings, the same reference signs denote the same elements or similar but not necessarily identical elements.

REFERENCE SIGNS

Figure 1:
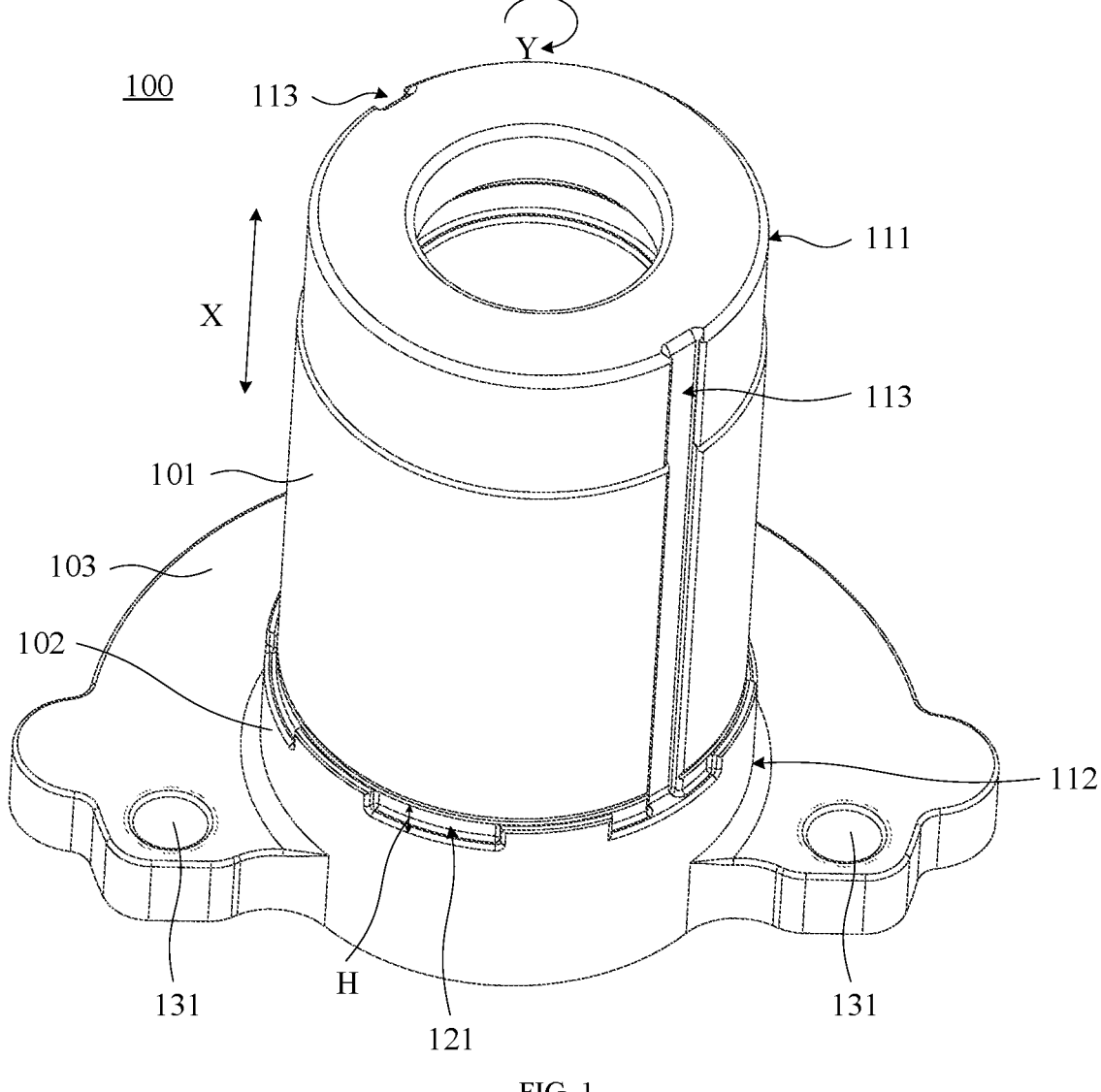
FIG. 1 shows a schematic structural diagram of a stator seat according to some embodiments of the present disclosure.

100. Stator seat; 101. Mounting column; 111. First end; 112. Second end; 113. Positioning groove; 102. Mounting boss; 121. Avoidance notch; 103. Connecting portion; 131. Connecting hole; 200. Wound stator; 201. Mounting main body; 211. Third end; 212. Fourth end; 213. Positioning key; 202. Toothed portion; 203. Winding; 231. Bridge wire; 204. Insulating layer.

DETAILED DESCRIPTION OF EMBODIMENTS

The present disclosure will be further described in detail below with reference to the accompanying drawings and the embodiments. It can be understood that specific embodiments described herein are used merely to explain a related invention, rather than limit the invention. It should be additionally noted that, for ease of description, only parts related to the related invention are shown in the accompanying drawings.

It should be noted that the embodiments in the present disclosure and features in the embodiments can be combined with each other without conflict. If the number of elements is not specifically defined, there may be one or more elements, unless otherwise expressly indicated in the context. In addition, numbers of steps or functional modules used in the present disclosure are used merely to identify the steps or functional modules, rather than limit either a sequence of performing the steps or a connection relationship between the functional modules.

In the present disclosure, unless otherwise stated, the terms "first", "second", etc. used to describe various elements are not intended to limit the positional, temporal or importance relationship of these elements, but rather only to distinguish one element from the other. In some examples, the first element and the second element may refer to the same instance of the element, and in some cases, based on contextual descriptions, the first element and the second element may also refer to different instances.

The terms used in the description of the various examples in the present disclosure are for the purpose of describing particular examples only and are not intended to be limiting. If the number of elements is not specifically defined, there may be one or more elements, unless otherwise expressly indicated in the context. Moreover, the term "and/or" used in the present disclosure encompasses any of and all possible combinations of listed items.

"LiDAR" refers to a radar system that uses light to detect a position of a target and obtain characteristic quantities such as a target distance, a target speed, and a target attitude. Generally, the LiDAR may comprise a light source, a signal steering system, and a photodetector. The light source is configured to generate light pulses. The signal steering system is configured to direct the light pulses emitted by the LiDAR in a specific direction, and the signal steering system can guide the emitted light pulses along different paths so that the LiDAR can scan a surrounding environment. The light pulses emitted by the LiDAR are reflected or scattered after reaching a surrounding object, and some of reflected or scattered light is returned to the LiDAR as a return signal. The signal steering system may be further configured to redirect the returned optical signal to the photodetector. The photodetector is configured to detect the returned optical signal. For example, the LiDAR may determine a distance to the object along a path of the emitted light pulses by using the time it takes to detect the returned optical signal after the emission of the light pulses and the speed of light. It is easy for those skilled in the art to understand that the LiDAR system may also use other technologies to measure the surrounding environment.

The term "rotating mirror" refers to an optical element that redirects light pulses or optical signals by means of a rotational movement of a mirror. In some examples, the rotating mirror is configured to be capable of rotating by 360° clockwise or anticlockwise, and is used, for example, to scan one or more signals in a horizontal direction of the LiDAR.

The term "oscillating mirror" refers to an optical element that redirects light pulses or optical signals by means of an oscillating movement of a mirror. In some examples, the oscillating mirror is configured to be capable of pitching by a predetermined angle, and is used, for example, to scan one or more signals in a vertical direction of the LiDAR.

The rotating mirror or the oscillating mirror of the LiDAR is driven by a motor to rotate or oscillate.

According to the embodiments of the present disclosure, a stator seat is proposed. By means of the stator seat, the squeezing of a winding against the stator seat can be reduced, thereby avoiding affecting the safety of the LiDAR. The LiDAR comprises a rotating mirror and/or an oscillating mirror.

FIG. 1 shows a schematic structural diagram of a stator seat according to some embodiments of the present disclosure. Referring to FIG. 1, the stator seat 100 comprises a mounting column 101. The mounting column 101 has a first end 111 and a second end 112 opposite to each other. An outer side wall of the mounting column 101 proximate to the second end 112 is provided with a surrounding mounting boss 102. The mounting boss 102 is provided with an avoidance structure, and the avoidance structure is configured to avoid a winding 203 (not shown in FIG. 1) of a wound stator 200 (not shown in FIG. 1).

In the embodiments of the present disclosure, the mounting column 101 is of an annular structure, and a middle portion of the mounting column 101 is hollow, and can be used to place a component such as a bearing. The mounting boss 102 may be configured to mount the wound stator 200. For example, the wound stator 200 is sleeved on the mounting column 101 and is retained on the mounting boss 102.

The winding of the wound stator is likely to accumulate and be squeezed against the mounting boss 102. When the stator seat 100 according to the present disclosure is applied to a stator assembly, the stator seat 100 cooperates with the wound stator. Since the mounting boss 102 is provided with the avoidance structure for avoiding the winding of the wound stator, the avoidance structure provides a mounting space for the winding. Even if the winding is accumulated, the squeezing thereof against the mounting boss 102 can still be reduced, thereby avoiding wire damage and avoiding affecting the safety of the LiDAR.

In some embodiments of the present disclosure, the avoidance structure comprises at least one avoidance notch 121, such as one or more avoidance notches 121. Referring to FIG. 1, the avoidance notch 121 is located on an end surface of the mounting boss 102 away from the second end 112, and the avoidance notch 121 is configured to positionally correspond to a toothed portion 202 (not shown in FIG. 1) of the wound stator 200 (not shown in FIG. 1).

The toothed portion 202 of the wound stator 200 is configured to arrange the winding, and the winding is likely to accumulate at a central position of the toothed portion 202. When the stator seat 100 according to the present disclosure is applied to a stator assembly, since the avoidance notch 121 positionally corresponds to the toothed portion 202 of the wound stator 200, the avoidance notch 121 can provide a mounting space for the winding, thereby reducing the squeezing of the winding against the mounting boss 102, avoiding wire damage, and avoiding affecting the safety of the LiDAR.

In the embodiments of the present disclosure, the mounting boss 102 may be connected to the mounting column 101 by welding. For example, an inner side wall of the mounting boss 102 is welded to an outer side wall of the mounting column 101; or the mounting boss and the mounting column 101 are manufactured by integral forming.

In some embodiments of the present disclosure, the avoidance structure comprises a plurality of avoidance notches 121, and the plurality of avoidance notches 121 are circumferentially arranged around the mounting boss 102.

The wound stator 200 comprises a plurality of toothed portions 202, each of the toothed portions 202 is provided with a winding. A plurality of avoidance notches 121 are arranged, and the plurality of avoidance notches 121 are circumferentially arranged around the mounting boss 102, so that each of the toothed portions 202 can positionally correspond to one avoidance notch 121, and the winding on each of the toothed portions 202 can be avoided, thereby reducing squeezing.

In an implementation of the embodiments of the present disclosure, in a radial direction of the mounting column 101, the avoidance notch 121 has a thickness equal to that of the mounting boss 102, so that a space provided by the avoidance notch 121 is large enough to ensure that more mounting space can be provided for the winding to avoid squeezing.

In another implementation of the embodiments of the present disclosure, in the radial direction of the mounting column 101, the avoidance notch 121 has a thickness less than that of the mounting boss 102. This design ensures that the avoidance notch 121 can provide a mounting space for the winding, while avoiding affecting the strength of the mounting boss 102 due to a too large avoidance notch 121.

According to some embodiments of the present disclosure, the avoidance notch 121 has a height H less than that of the mounting boss 102 in an axial direction X of the mounting column 101. The axial direction X of the mounting column 101 is a height direction of the mounting column 101.

In the embodiments of the present disclosure, the height H of the avoidance notch 121 is less than that of the mounting boss 102, that is, the avoidance notch 121 only penetrates the end surface of the mounting boss 102 away from the second end 112, but does not penetrate an end surface of the mounting boss 102 close to the second end 112. This ensures that the avoidance notch 121 can provide a mounting space for the winding while avoiding affecting the strength of the mounting boss 102 by the avoidance notch 121 to affect assembly strength between the stator seat 100 and the wound stator 200.

According to some embodiments of the present disclosure, the height H of the avoidance notch 121 is greater than or equal to 0.2 millimeters (mm) and less than or equal to 2 millimeters in the axial direction X of the mounting column 101. Setting the height H of the avoidance notch 121 within the above range enables the avoidance notch 121 to provide a mounting space for the winding, and also prevents the height of the avoidance notch 121 from being too large. If a dimension of the avoidance notch 121 is too large, it affects the strength of the mounting boss 102 and thus affects the assembly strength between the stator seat 100 and the wound stator 200.

Illustratively, the height H of the avoidance notch 121 may be 0.25 millimeters.

Figure 2:
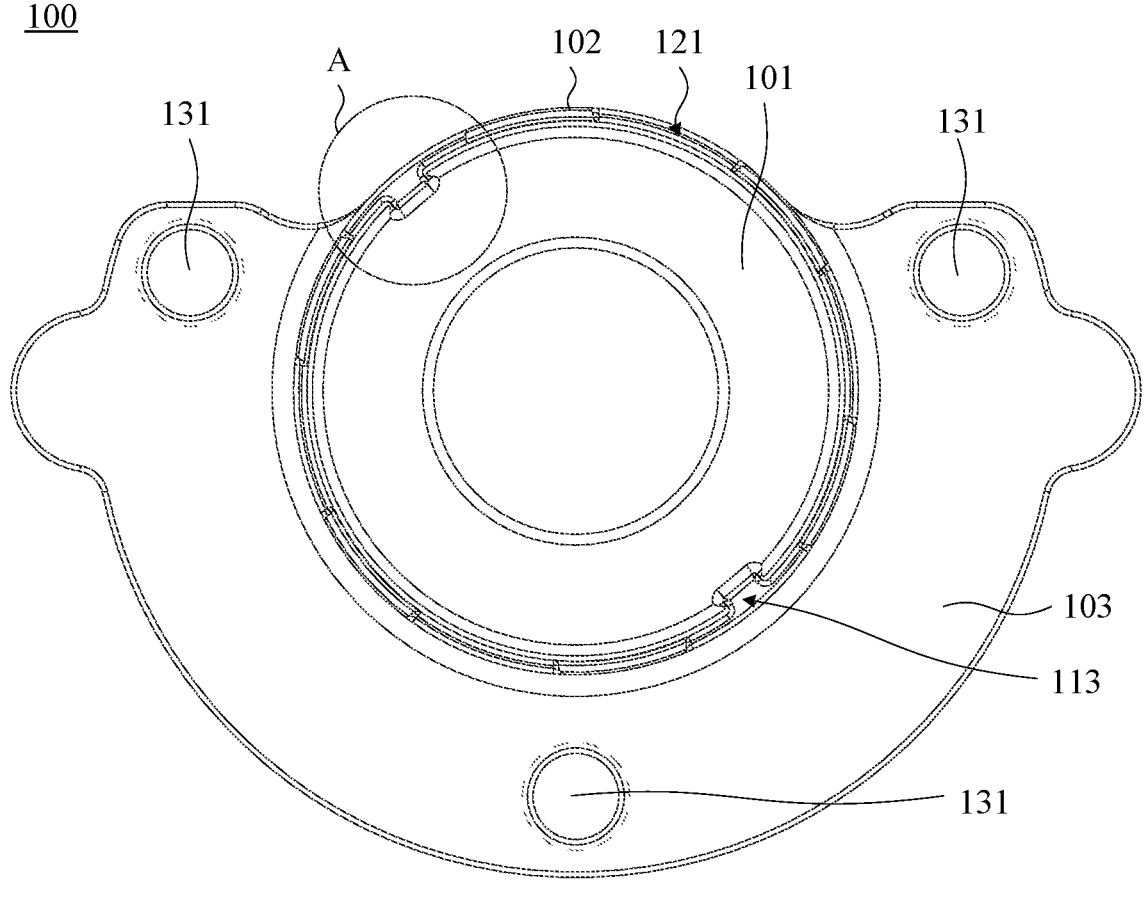
FIG. 2 shows a top view of a stator seat according to some embodiments of the present disclosure.
Figure 3:
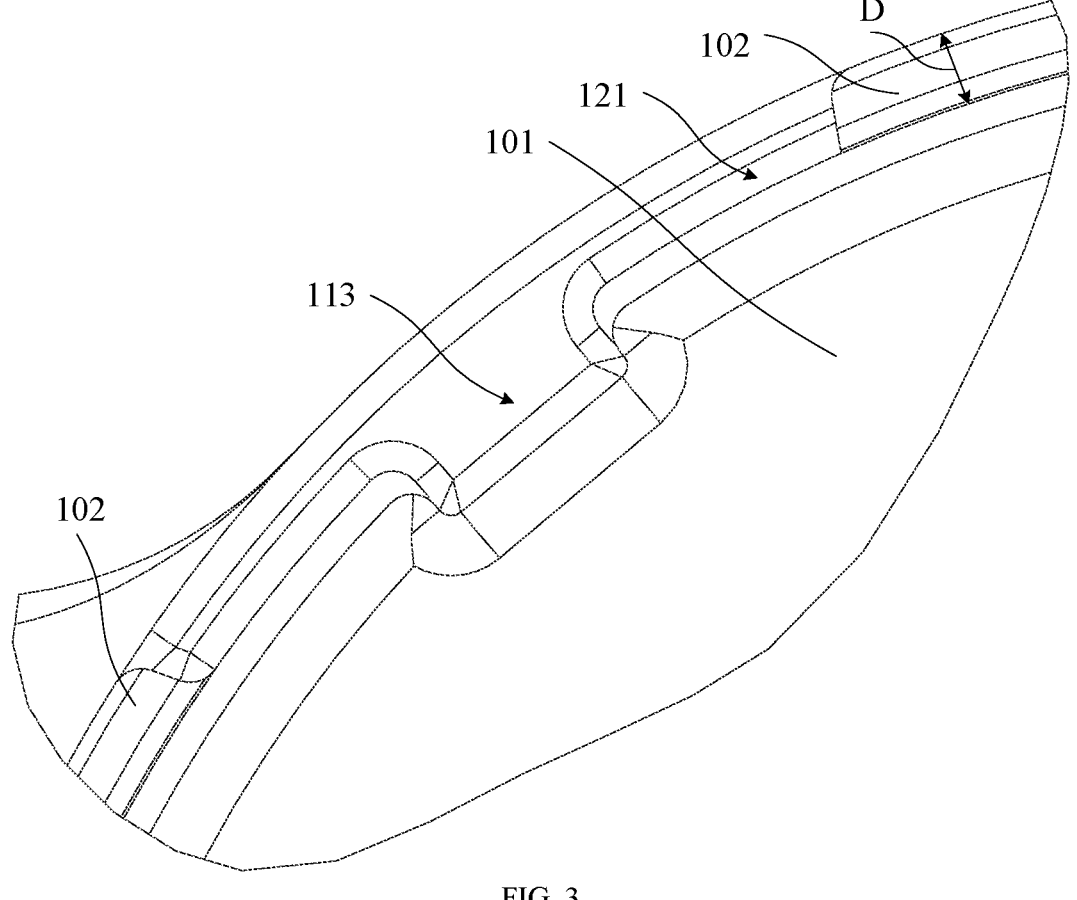
FIG. 3 shows an enlarged view of a part A of FIG. 2.

FIG. 2 shows a top view of a stator seat according to some embodiments of the present disclosure. FIG. 3 shows an enlarged view of a part A of FIG. 2. Referring to FIGS. 2 and 3, the mounting boss 102 has a thickness D greater than or equal to 0.2 millimeters and less than or equal to 5 millimeters in the radial direction of the mounting column 101.

Since the end surface of the mounting boss 102 away from the second end 112 is a mounting surface, the larger the thickness D of the mounting boss 102, the larger the dimension of the mounting surface. Setting the thickness D of the mounting boss 102 within the above range ensures the strength of mounting surfaces of the stator seat 100 and the wound stator 200, and prevents the mounting boss 102 from protruding too much relative to the mounting column 101, which affects the dimension of the stator seat 100 and does not facilitate a miniaturization design of a device.

Illustratively, the thickness D of the mounting boss 102 is equal to 0.5 millimeters.

According to some embodiments of the present disclosure, referring to FIGS. 1 and 2, an outer side surface of the mounting column 101 is provided with at least one positioning groove 113, the positioning groove 113 penetrates an end surface of the first end 111 of the mounting column 101, and the positioning groove 113 extends in the axial direction X of the mounting column 101. When the stator seat 100 is assembled to the wound stator 200, positioning of the positioning groove 113 can be achieved, which makes the assembly more convenient.

According to some embodiments of the present disclosure, the outer side surface of the mounting column 101 is provided with two positioning grooves 113, and the two positioning grooves 113 are arranged opposite to each other in the radial direction of the mounting column 101. With the provision of the two positioning grooves 113, positioning can be achieved, and the number of positioning grooves 113 is not too large, thereby reducing the difficulty of a manufacturing process.

According to some embodiments of the present disclosure, the positioning groove 113 positionally corresponds to the avoidance structure in a circumferential direction Y of the mounting column 101. That is, the positioning groove 113 is arranged above the avoidance structure in the axial direction X of the mounting column 101, and the positioning of the positioning groove 113 can be achieved by the avoidance structure. The mounting column 101 is cylindrical in shape, and the circumferential direction Y of the mounting column 101 is a circumferential direction of an end surface of the mounting column 101.

Illustratively, a central axis of the positioning groove 113 coincides with a central axis of one avoidance notch 121 of the plurality of avoidance notches 121.

According to some embodiments of the present disclosure, the positioning groove 113 is in communication with one avoidance notch 121 of the plurality of avoidance notches 121. That is, in the axial direction X of the mounting column 101, the positioning groove 113 extends from the end surface of the first end 111 all the way to the avoidance notch 121, so that a positioning key of the wound stator 200 that cooperates with the positioning groove 113 has a length that may be set relatively large, and the positioning groove 113 and the positioning key may also achieve an assembly function, thereby further improving the assembly strength between the stator seat 100 and the wound stator 200.

According to some embodiments of the present disclosure, referring to FIGS. 1 and 2, the stator seat 100 further comprises a connecting portion 103. The connecting portion 103 is connected to the second end 112. The connecting portion 103 may connect the stator seat 100 to other components.

Illustratively, the connecting portion 103 is provided with a plurality of connecting holes 131, and the connecting holes 131 are configured to be connected to other components.

For example, the connecting portion 103 is provided with three connecting holes 131. In other implementations, the connecting portion 103 may be provided with a different number of connecting holes 131, which is not limited by the present disclosure.

In the embodiments of the present disclosure, the stator seat 100 may be made of iron.

Figure 4:
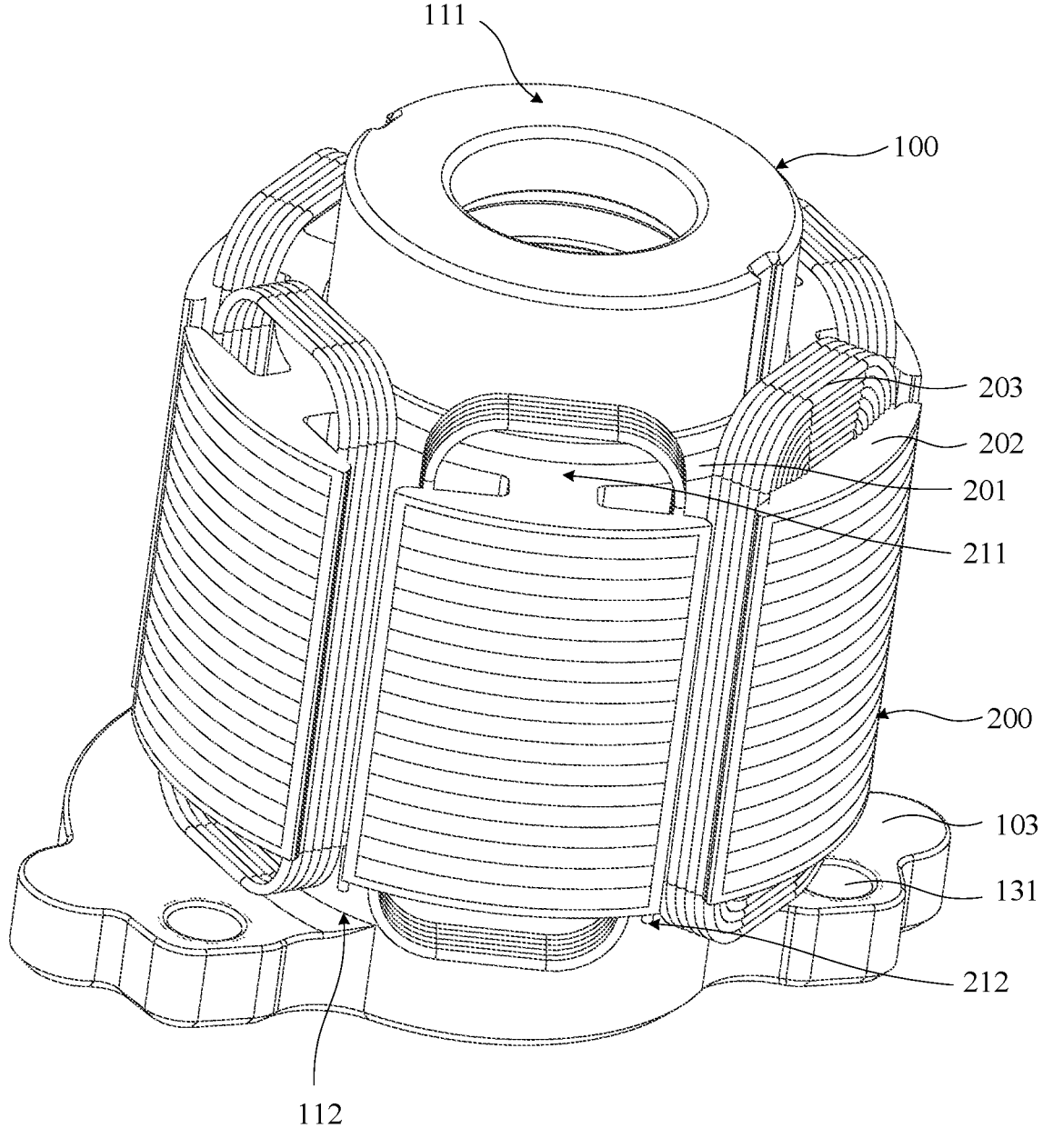
FIG. 4 shows a schematic structural diagram of a stator assembly according to some embodiments of the present disclosure.

The embodiments of the present disclosure further provide a stator assembly. FIG. 4 shows a schematic structural diagram of a stator assembly according to some embodiments of the present disclosure. Referring to FIG. 4, the stator assembly comprises the stator seat 100 described above and a wound stator 200. The wound stator 200 is sleeved on a mounting column 101 of the stator seat 100.

Figure 5:
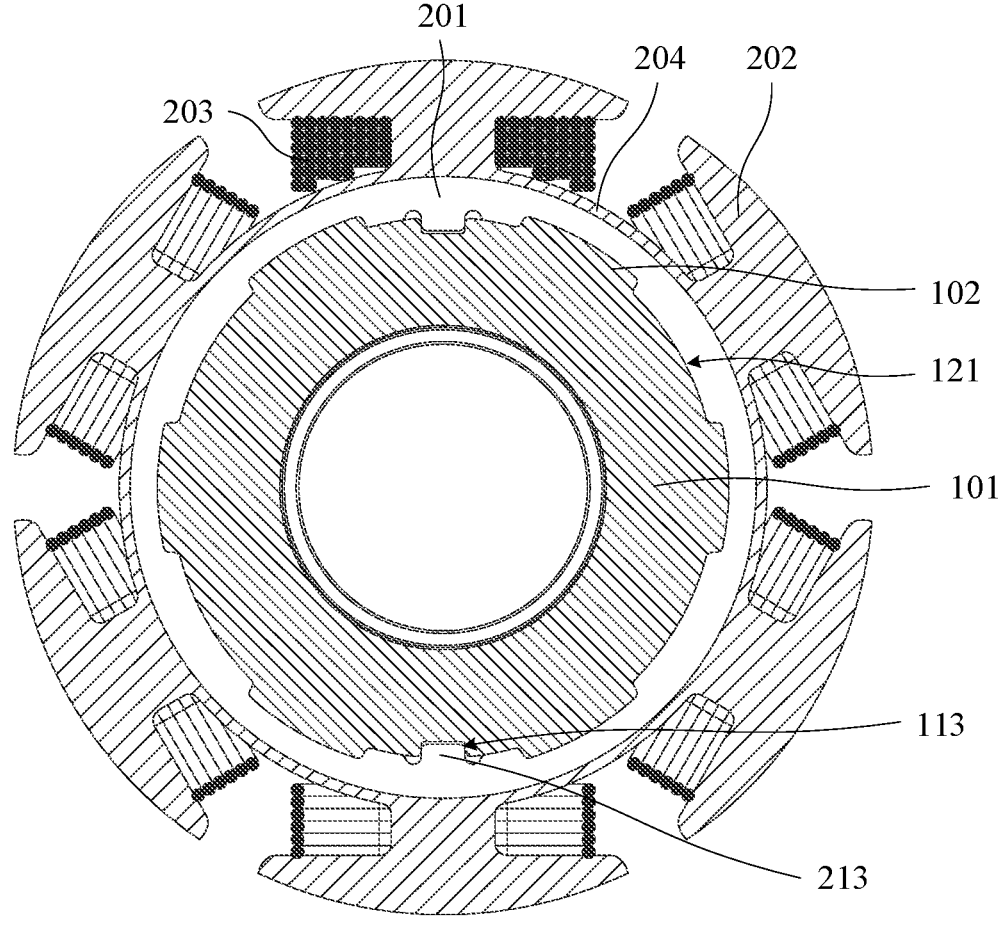
FIG. 5 shows a horizontal cross-sectional view of a stator assembly according to some embodiments of the present disclosure.

FIG. 5 shows a horizontal cross-sectional view of a stator assembly according to some embodiments of the present disclosure. Referring to FIG. 5, when the stator seat 100 is assembled to the wound stator 200, the toothed portions 202 are opposite to the avoidance notches 121. Currently, the wound stator 200 uses a flyer winding method, which is irregular, resulting in that the winding in the middle of the toothed portion 202 protrudes, so that the winding is very likely to interfere with the stator seat 100. Since the avoidance notch 121 positionally corresponds to the toothed portion 202 of the wound stator 200, the avoidance notch 121 can provide a mounting space for the winding, to prevent the winding from being subjected to wire damage and the like during assembly, ensuring the reliability of the insulation, voltage resistance and other performances of the motor, and improving the safety of the LiDAR.

Figure 6:
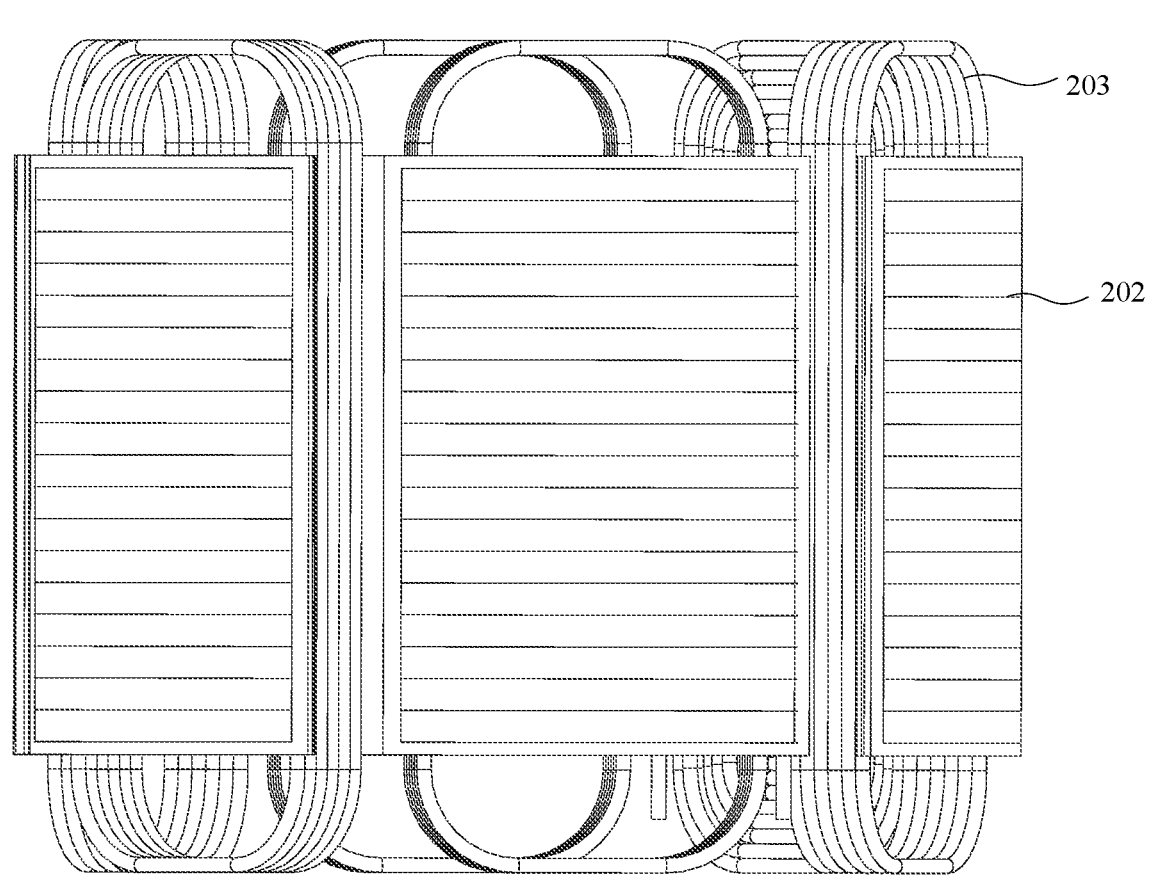
FIG. 6 shows a front view of a wound stator according to some embodiments of the present disclosure.
Figure 7:
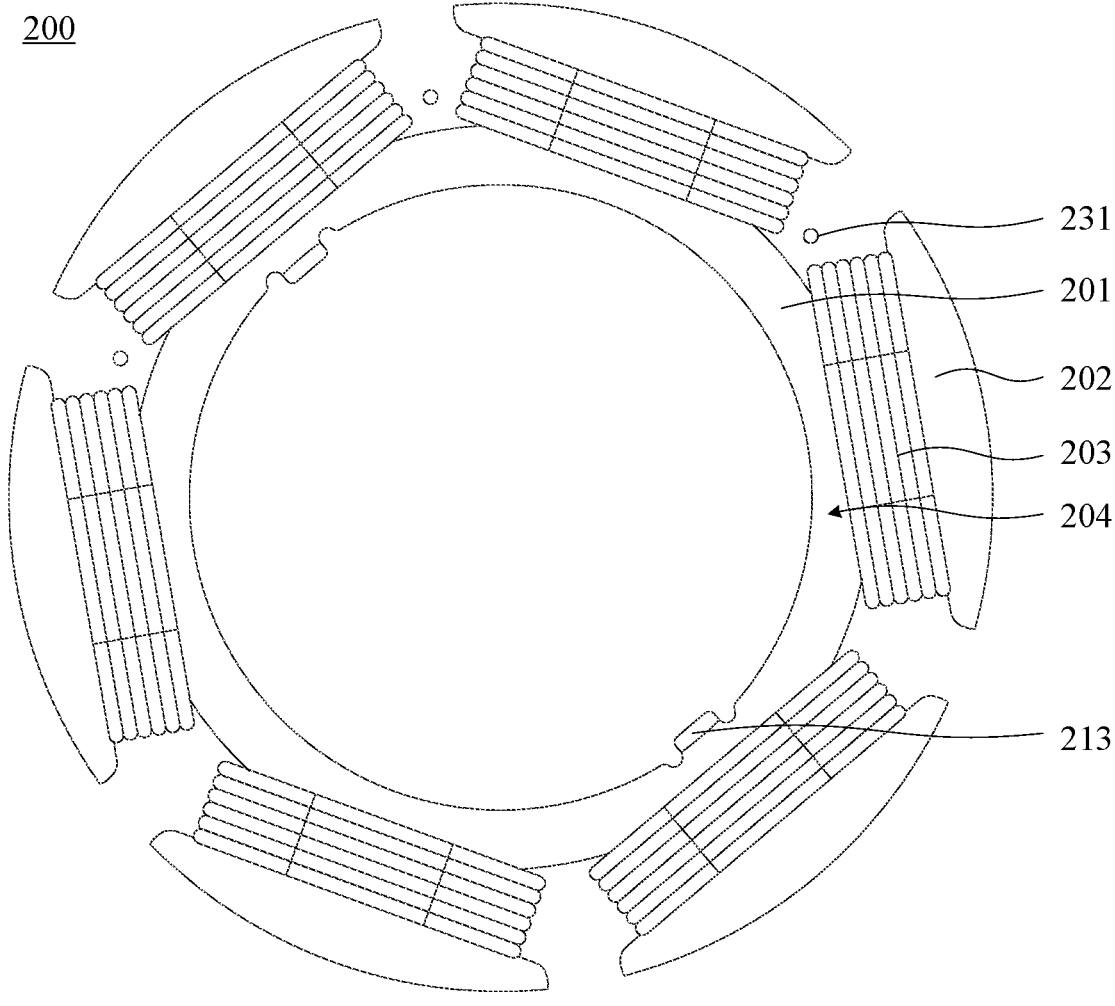
FIG. 7 shows a top view of a wound stator according to some embodiments of the present disclosure.
Figure 8:
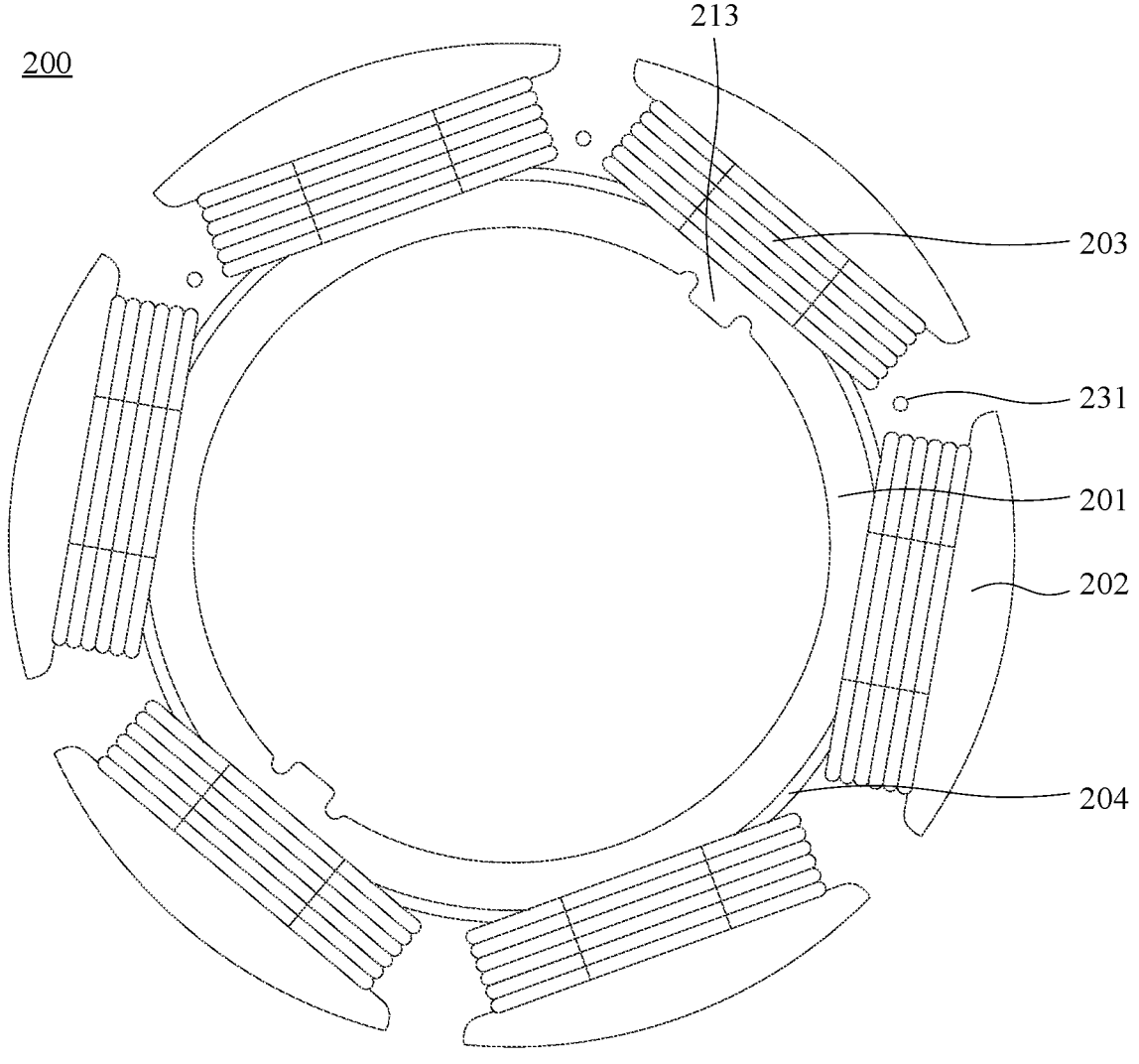
FIG. 8 shows a bottom view of a wound stator according to some embodiments of the present disclosure.

FIG. 6 shows a front view of a wound stator according to some embodiments of the present disclosure. FIG. 7 shows a top view of a wound stator according to some embodiments of the present disclosure. FIG. 8 shows a bottom view of a wound stator according to some embodiments of the present disclosure. With reference to FIGS. 4 to 8, the wound stator 200 comprises a mounting main body 201 and at least one toothed portion 202. The mounting main body 201 has a third end 211 and a fourth end 212 opposite to each other. An end surface of the fourth end 212 is attached to an end surface of the mounting boss 102 away from the second end 112. The toothed portion 202 is connected to an outer side surface of the mounting main body 201.

In the embodiments of the present disclosure, the mounting main body 201 is configured to be sleeved on the mounting column 101, and after the wound stator 200 is assembled on the stator seat 100, the end surface of the fourth end 212 is attached to the end surface of the mounting boss 102 away from the second end 112.

In the embodiments of the present disclosure, the wound stator 200 may comprise a plurality of toothed portions 202, and the plurality of toothed portions 202 are circumferentially arranged at intervals around the mounting main body 201. The wound stator 200 further comprises windings 203, and the windings 203 are wound around the toothed portions 202.

In the embodiments of the present disclosure, the end surface of the fourth end 212 of the mounting main body 201 is attached to the end surface of the mounting boss 102 away from the second end 112, so that the end surface of the mounting boss 102 away from the second end 112 provides a mounting surface for the wound stator 200, and the winding 203 can be opposite to the avoidance notch 121, thereby reducing the occurrence of wire pressing.

In the embodiments of the present disclosure, the mounting main body 201 and the toothed portions 202 may be made of iron, and the winding 203 may be a copper wire.

In some embodiments of the present disclosure, the mounting main body 201 and the toothed portions 202 may be connected to each other by welding.

In some other embodiments of the present disclosure, the mounting main body 201 and the toothed portions 202 may be manufactured by integral forming.

In some other embodiments of the present disclosure, the wound stator 200 comprises six toothed portions 202. In this case, the stator seat 100 comprises six avoidance notches 121. In other embodiments, a number of toothed portions 202 and a number of avoidance notches 121 may be set as required, which is not limited by the present disclosure.

Figure 9:
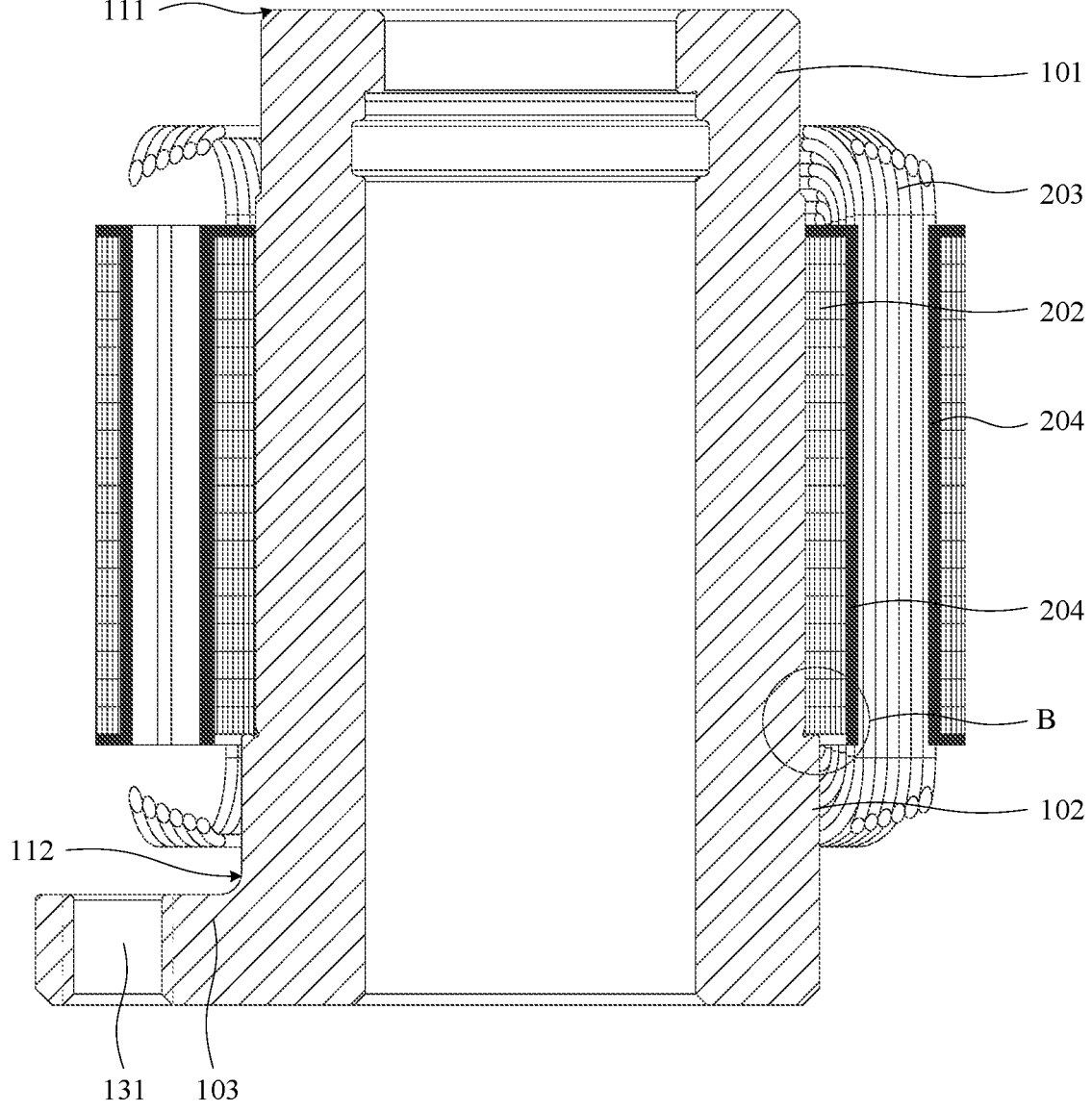
FIG. 9 shows a vertical cross-sectional view of a stator assembly according to some embodiments of the present disclosure.
Figure 10:
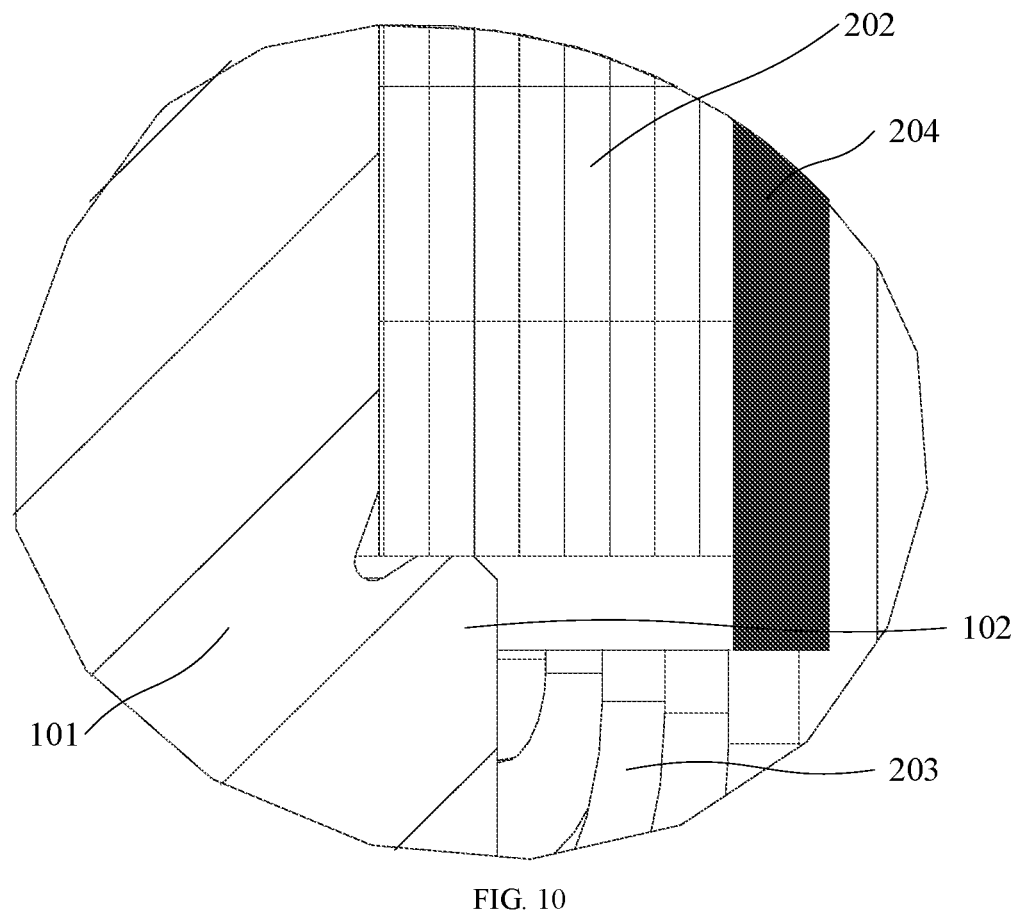
FIG. 10 shows an enlarged view of a part B of FIG. 9.

According to some embodiments of the present disclosure, FIG. 9 shows a vertical cross-sectional view of a stator assembly according to some embodiments of the present disclosure. FIG. 10 shows an enlarged view of a part B of FIG. 9. With reference to FIGS. 9 and 10, surfaces of the plurality of toothed portions 202 and an end surface of the third end 211 of the mounting main body 201 each are provided with an insulating layer 204. The windings 203 are wound around the toothed portions 202, and the surfaces of the toothed portions 202 each are provided with the insulating layer 204, so that the insulation between the winding 203 and the toothed portion 202 can be ensured. The end surface of the third end 211 of the mounting main body 201 is provided with the insulating layer 204, so that other traces may be placed on the end surface of the third end 211.

In the embodiments of the present disclosure, an end surface of the fourth end 212 of the mounting main body 201 is used for mounting, and it is necessary to ensure that the end surface of the fourth end 212 of the mounting main body 201 is closely attached to an end surface of the mounting boss 102. Therefore, there is no need to arrange the insulating layer 204 on the end surface of the fourth end 212 of the mounting main body 201, so as to prevent unevenness of the end surface of the fourth end 212 caused by the insulating layer 204 and not affect the attachment.

Illustratively, the insulating layer 204 may be manufactured by spraying.

In some embodiments of the present disclosure, the end surface of the fourth end 212 of the mounting main body 201 and the end surface of the mounting boss 102 may both have rounded boundaries to avoid scratching the winding 203 during assembly.

According to some embodiments of the present disclosure, a bridge wire 231 of the winding 203 is located on the end surface of the third end 211 of the mounting main body 201.

In the embodiments of the present disclosure, the end surface of the fourth end 212 of the mounting main body 201 is used for mounting. If the bridge wire 231 passes across the end surface of the fourth end 212 of the mounting main body 201 so that the space is narrow, there is a possibility of crushing a paint film of the bridge wire 231 or directly damaging the winding 203, thereby posing risks to the insulation, voltage resistance, and the like of the stator assembly. The end surface of the third end 211 is arranged to allow the bridge wire 231 to pass across, and the two functions of allowing the bridge wire 231 to pass across and mounting are respectively achieved at the third end 211 and the fourth end 212, so that the implementation is facilitated, and the above risks can also be prevented.

In an implementation of the embodiments of the present disclosure, a bridge wire 231 of each phase of the motor is routed from the end surface of the third end 211 of the mounting main body 201, so there is no influence on the electromagnetism of the motor.

The bridge wires 231 of FIGS. 7 and 8 are only used as an example.

According to some embodiments of the present disclosure, when the outer side surface of the mounting column 101 is provided with positioning grooves 113, an inner side surface of the mounting main body 201 is provided with positioning keys 213, and the positioning keys 213 are in a one-to-one correspondence with the positioning grooves 113. Arranging the positioning keys 213 to cooperate with the positioning grooves 113 achieves the positioning during assembly of the stator seat 100 and the wound stator 200, which is more convenient.

According to some embodiments of the present disclosure, the positioning keys 213 each are connected to the end surface of the third end 211 and the end surface of the fourth end 212. That is, the length of each of the positioning keys 213 is the same as that of the mounting main body 201, so that the positioning key 213 has a relatively large length, and the positioning groove 113 and the positioning key 213 can also achieve an assembly function, thereby further improving the assembly strength between the stator seat 100 and the wound stator 200.

The stator assembly according to the embodiments of the present disclosure does not affect the lead-out of a leading-out wire of the stator assembly.

The embodiments of the present disclosure further provide a motor for a rotating mirror of a LiDAR, the motor comprising the stator assembly described above. The motor according to the embodiments of the present disclosure can reduce the squeezing of the winding against the stator seat, thereby preventing wire damage and avoiding affecting the safety of the motor.

The embodiments of the present disclosure further provide a LiDAR, comprising the motor described above. The LiDAR according to the embodiments of the present disclosure can reduce the squeezing of the winding against the stator seat, thereby preventing wire damage and avoiding affecting the safety of the LiDAR.

According to another aspect of the present disclosure, a carrier system is provided, comprising the LiDAR described above. A carrier includes, but is not limited to, a vehicle, an unmanned aerial vehicle, a ship, etc., and application scenarios of the carrier include but are not limited to roadside detection devices, and other systems with a plurality of sensors that are used for dock monitoring, intersection monitoring, factories, etc.

Some exemplary solutions of the present disclosure are described below.

Solution 1. A stator seat, comprising: a mounting column having a first end and a second end opposite to each other, wherein an outer side wall of the mounting column proximate to the second end is provided with a surrounding mounting boss, the mounting boss is provided with an avoidance structure, and the avoidance structure is configured to avoid a winding of a wound stator.

Solution 2. The stator seat according to solution 1, wherein the avoidance structure comprises at least one avoidance notch, the avoidance notch is located on an end surface of the mounting boss away from the second end, and the avoidance notch is configured to positionally correspond to a toothed portion of the wound stator.

Solution 3. The stator seat according to solution 2, wherein the avoidance structure comprises a plurality of avoidance notches, and the plurality of avoidance notches are circumferentially arranged around the mounting boss.

Solution 4. The stator seat according to solution 2 or 3, wherein the avoidance notch has a height less than that of the mounting boss in an axial direction of the mounting column.

Solution 5. The stator seat according to any one of solutions 2 to 4, wherein the height of avoidance notch is greater than or equal to 0.2 millimeters and less than or equal to 2 millimeters in the axial direction of the mounting column.

Solution 6. The stator seat according to any one of solutions 1 to 5, wherein the mounting boss has a thickness greater than or equal to 0.2 millimeters and less than or equal to 5 millimeters in a radial direction of the mounting column.

Solution 7. The stator seat according to any one of solutions 1 to 6, wherein an outer side surface of the mounting column is provided with at least one positioning groove, the positioning groove penetrates an end surface of the first end of the mounting column, and the positioning groove extends in the axial direction of the mounting column.

Solution 8. The stator seat according to solution 7, wherein the positioning groove positionally corresponds to the avoidance structure in a circumferential direction of the mounting column.

Solution 9. The stator seat according to solution 8, wherein when the avoidance structure comprises an avoidance notch, the positioning groove is in communication with the avoidance notch.

Solution 10. The stator seat according to any one of solutions 7 to 9, wherein the outer side surface of the mounting column is provided with two positioning grooves, and the two positioning grooves are arranged opposite to each other in the radial direction of the mounting column.

Solution 11. The stator seat according to any one of solutions 1 to 10, further comprising: a connecting portion connected to the second end.

Solution 12. A stator assembly, comprising: a stator seat according to any one of solutions 1 to 11; and a wound stator sleeved on a mounting column of the stator seat.

Solution 13. The stator assembly according to solution 12, wherein the wound stator comprises: a mounting main body having a third end and a fourth end opposite to each other, an end surface of the fourth end being attached to an end surface of the mounting boss away from the second end; and at least one toothed portion connected to an outer side surface of the mounting main body; wherein a side surface of each toothed portion and an end surface of the third end of the mounting main body each are provided with an insulating layer.

Solution 14. The stator assembly according to solution 13, wherein the wound stator further comprises: a winding wound around the toothed portion, a bridge wire of the winding being located on the end surface of the third end of the mounting main body.

Solution 15. The stator assembly according to solution 13 or 14, wherein when the outer side surface of the mounting column is provided with positioning grooves, an inner side surface of the mounting main body is provided with positioning keys, and the positioning keys are in a one-to-one correspondence with the positioning grooves.

Solution 16. The stator assembly according to solution 15, wherein the positioning keys each are connected to the end surface of the third end and the end surface of the fourth end.

Solution 17. A motor for a rotating mirror of a LiDAR, the motor comprising the stator assembly according to any one of solutions 12 to 16.

Solution 18. A LiDAR, comprising the motor according to solution 17.

Solution 19. A carrier system, comprising a LiDAR according to solution 18.

The above descriptions are merely preferred embodiments of the present disclosure and explanations of the technical principles utilized. Those skilled in the art should understand that the scope of the invention involved in the embodiments of the present disclosure is not limited to the technical solutions formed by specific combinations of the foregoing technical features, and shall also cover other technical solutions formed by any combination of the foregoing technical features or equivalent features thereof without departing from the foregoing inventive concept. For example, a technical solution formed by a replacement of the above features with technical features with similar functions in the technical features disclosed in the embodiments of the present disclosure (but not limited thereto) also falls within the scope of the present disclosure.

What is claimed is:

1. A stator seat, comprising:

a mounting column having a first end and a second end opposite to each other, wherein:

an outer side wall of the mounting column proximate to the second end is provided with a surrounding mounting boss, the mounting boss is provided with an avoidance structure, and the avoidance structure is configured to avoid a winding of a wound stator.

2. The stator seat according to claim 1, wherein:

The avoidance structure comprises at least one avoidance notch, the avoidance notch is located on an end surface of the mounting boss away from the second end, and the avoidance notch is configured to positionally correspond to a toothed portion of the wound stator.

3. The stator seat according to claim 2, wherein:

the avoidance structure comprises a plurality of avoidance notches, and the plurality of avoidance notches are circumferentially arranged around the mounting boss.

4. The stator seat according to claim 2, wherein the avoidance notch has a height less than that of the mounting boss in an axial direction of the mounting column.

5. The stator seat according to claim 1, wherein:

an outer side surface of the mounting column is provided with at least one positioning groove, the positioning groove penetrates an end surface of the first end of the mounting column, and the positioning groove extends in an axial direction of the mounting column.

6. The stator seat according to claim 5, wherein the positioning groove positionally corresponds to the avoidance structure in a circumferential direction of the mounting column.

7. The stator seat according to claim 6, wherein when the avoidance structure comprises an avoidance notch, the positioning groove is in communication with the avoidance notch.

8. The stator seat according to claim 5, wherein the outer side surface of the mounting column is provided with two positioning grooves, and the two positioning grooves are arranged opposite to each other in a radial direction of the mounting column.

9. The stator seat according to claim 1, further comprising:

a connecting portion connected to the second end.

10. A stator assembly, comprising:

a stator seat including:

a mounting column having a first end and a second end opposite to each other, wherein:

an outer side wall of the mounting column proximate to the second end is provided with a surrounding mounting boss, the mounting boss is provided with an avoidance structure, and the avoidance structure is configured to avoid a winding of a wound stator; and a wound stator sleeved on a mounting column of the stator seat.

11. The stator assembly according to claim 10, wherein the wound stator comprises:

a mounting main body having a third end and a fourth end opposite to each other, an end surface of the fourth end being attached to an end surface of the mounting boss away from the second end; and at least one toothed portion connected to an outer side surface of the mounting main body;

wherein a surface of each toothed portion and an end surface of the third end of the mounting main body each are provided with an insulating layer.

12. The stator assembly according to claim 11, wherein the wound stator further comprises:

a winding wound around the toothed portion, a bridge wire of the winding being located on the end surface of the third end of the mounting main body.

13. The stator assembly according to claim 11, wherein when the outer side surface of the mounting column is provided with positioning grooves, a side surface of the mounting main body is provided with positioning keys, and the positioning keys are in a one-to-one correspondence with the positioning grooves.

14. The stator assembly according to claim 13, wherein the positioning keys each are connected to the end surface of the third end and the end surface of the fourth end.

15. A motor for a rotating mirror of a LiDAR, wherein the motor comprises a stator assembly according to claim 10.

16. A LiDAR, comprising:

a motor for a rotating mirror of the LiDAR, wherein the motor comprises:

a stator assembly, comprises:

a stator seat including:

a mounting column having a first end and a second end opposite to each other, wherein:

an outer side wall of the mounting column proximate to the second end is provided with a surrounding mounting boss, the mounting boss is provided with an avoidance structure, and the avoidance structure is configured to avoid a winding of a wound stator; and a wound stator sleeved on a mounting column of the stator seat.

17. A carrier system, comprising a LiDAR according to claim 16.

* * * * *